United States Patent Office 3,468,689
Patented Sept. 23, 1969

3,468,689
PROCESS FOR PREPARING IMPROVED
TITANIUM DIOXIDE
Harry Lott, Jr., Akron, Albert Dietz and Donald E. Darr,
Wadsworth, Ohio, assignors to PPG Industries Inc.,
Pittsburgh, Pa., a corporation of Pennsylvania
No Drawing. Filed Aug. 9, 1965, Ser. No. 478,473
Int. Cl. C09c 1/36, 3/00; C01g 23/04
U.S. Cl. 106—300         16 Claims

ABSTRACT OF THE DISCLOSURE

An aqueous slurry of raw pigmentary metal oxide, particularly titanium dioxide, prepared by vapor phase oxidation of the corresponding metal halide, e.g., titanium tetrachloride, is digested in the presence of a Group II element having an atomic weight less than 200 in order to improve pigment properties, e.g., tinting strength and tint efficiency.

---

This invention relates to a process for wet treating raw pigmentary metal oxide. More particularly, this invention relates to a process for wet treating and significantly improving the pigmentary properties of a metal oxide, notably titanium oxide, produced by the vapor phase oxidation of a metal halide.

Titanium oxide is currently produced commercially by at least two processes, the chloride process and the sulfate process.

The chloride process involves the vapor phase oxidation or hydrolysis of at least one titanium halide selected from the group consisting of titanium chloride, titanium bromide, and titanium iodide, e.g., a titanium tetrahalide such as $TiCl_4$, $TiBr_4$, and $TiI_4$.

Typical chloride processes wherein titanium oxide is produced by the vapor phase oxidation or hydrolysis of a selected titanium halide include U.S. Letters Patents 2,450,156 to Pechukas; 2,937,928 to Hughes et al.; 2,968,529 to Wilson; 3,068,113 to Strain et al.; and 3,069,281 to Wilson. Such vapor phase oxidation process may be conducted in a fluidized bed as disclosed in U.S. Letters Patents 2,760,846 to Richmond; 2,856,264 to Dunn, Jr.; and 2,964,386 to Evans et al.

Such vapor phase oxidation or hydrolysis processes, commonly referred to as chloride processes, are readily distinguishable from the so-called sulfate processes as disclosed, for example, in U.S. Letters Patents 2,505,344; 2,766,133; 2,933,408; and 2,982,613.

The practice of this invention is expressly limited to a vapor phase process as distinguished from a sulfate process.

In accordance with the practice of this invention, a slurry of raw vapor phase oxidation produced metal oxide, such as titanium oxide, is digested in the presence of at least one Group II element having an atomic weight of less than 200 using Mendeleeff's Periodic Arrangement of the Elements, as presented on pages 54 and 55 of Lange's Handbook of Chemistry, eighth edition, published by Handbook Publishers, Inc., Sandusky, Ohio (1952).

Thus, the raw pigment is digested in the presence of at least one cation of the group consisting of beryllium, magnesium, calcium, zinc, strontium, cadmium, and barium.

It has been discovered that when a raw pigment slurry is digested in accordance with this invention, e.g., in the presence of a Group II cation, there results a significant improvement in the pigment properties, particularly tint efficiency and tinting strength. Likewise, the pigment dispersibility and wetting properties, especially in organic vehicles, are significantly improved.

Raw pigment, particularly raw titanium oxide pigment, as used herein, is defined as a pigment (produced by a vapor phase oxidation process) which has had its chemical composition substantially unaltered.

Thus, a pigment subsequent to withdrawal from a vapor phase oxidation or hydrolysis zone may be physically treated, e.g., by milling, grinding, hydroseparating, filtering, without changing the basic chemical composition of the pigment. Such pigment is defined herein as a raw pigment.

A raw pigment is therefore to be distinguished from a finished or treated pigment, the latter being a pigment which has been given an organic and/or inorganic coating or treatment as disclosed, for example, in U.S. Letters Patents 2,046,823 to Johnson; 2,717,246 to Kienle et al.; 2,721,853 to Eastes et al.; or 3,146,119 to Dr. Hartien S. Ritter.

In the practice of this invention, a source of at least one selected Group II cation is incorporated in the raw pigment slurry in an amount which will provide for at least 1,000 parts, more beneficially at least 2,000 parts, by weight of the selected Group II cation per million parts by weight of the raw pigment content of the slurry.

Although it is contemplated in the preferred embodiment of this invention that the slurry be initially pure of Group II cations or sources thereof, such may be present if the slurry or filtrate thereof is recycled. Likewise, Group II cations and/or sources thereof may be initially present in the slurry when the pigment is slurried with hard water, e.g., water containing minerals of group II (commonly calcium and/or magnesium compounds).

Where Group II cations or sources thereof are present in the slurry, the amount thereof is substracted from the amount of Group II cation to be incorporated in the slurry.

For example, if a slurry contains 400 parts by weight of at least one Group II cation per million parts by weight of raw pigment, additional Group II source is incorporated in the slurry in an amount sufficient to bring the Group II content of the slurry up to at least 1,000 parts by weight per million parts by weight raw pigment.

If the pigment is slurried with a hard water, the Group II content of such water should not exceed 800 parts by weight per million parts by weight of raw pigment slurried in the water.

Accordingly, where Group II cations are initially present in the slurry due to the use of a hard water, it is contemplated that the additional Group II cations incorporated in the slurry be at least 20 percent by weight of the total Group II cation present during the slurry digestion; that is, the amount of Group II cation incorporated in the slurry independently of the existing Group II concentration (due to water hardness) must be at least 200 parts by weight per million parts by weight of raw pigment.

Preferably, there is incorporated at least 500 parts by weight Group II cation per million parts by weight raw pigment in addition to Group II cations contributed by the hard water.

In the ideal embodiment, it is contemplated slurrying the pigment in water containing less than 50 parts by weight Group II cation (per million parts by weight raw pigment) with best results being obtained with water containing substantially no Group II cation concentration, e.g., such as distilled, deionized or boiler water.

Thus, in the preferred embodiment of this invention, the raw pigment is slurried in distilled or deionized water containing substantially no Group II cations such that substantially all of the Group II cation is incorporated independently of any existing Group II cations in the slurry water.

Although the source of Group II cations incorporated in the slurry may be an elemental Group II member, preferred results are obtained by using a Group II compound which is soluble at any selected slurry pH.

Thus, it is contemplated using a Group II compound which is soluble in the slurry in an acid or alkaline pH range. It is particularly desirable that the compound be soluble in the slurry at the pH of the digestion.

Typical compounds comprise both organic and inorganics including as bases, acetates, halides, amides, carbonates, phosphates, sulfates, sulfides, nitrides, nitrates, and silicates.

Examples of such compounds include, not by way of limitation, $BeBr_2$ (beryllium bromide),
$Be_2C$ (beryllium carbide),
$BeCl_2$ (beryllium chloride),
$BeCl_2 \cdot 4H_2O$,
$BeF_2$,
$BeI_2$,
$Be(NO_3)_2 \cdot 4H_2O$ (beryllium nitrate),
$BeF_2 \cdot 2KF$ (beryllium potassium fluoride),
$BeF_2 \cdot 2NaF$,
$BeSO_4$,
$BeSO_4 \cdot 4H_2O$,
$Mg(C_2H_3O_2)_2$ (magnesium acetate),
$Mg(C_2H_3O_2)_2 \cdot 4H_2O$,
$MgCl_2 \cdot 4NH_4Cl \cdot 6H_2O$ (magnesium ammonium chloride),
$MgCrO_4(NH_4)_2CrO_4 \cdot 6H_2O$ (magnesium ammonium chromate),
$MgNH_4PO_4 \cdot 6H_2O$ (magnesium ammonium phosphate),
$MgSO_4 \cdot (NH_4)_2SO_4 \cdot 6H_2O$ (magnesium ammonium sulfate),
$Mg(C_7H_5O_2)_2 \cdot 3H_2O$ (magnesium benzoate),
$Mg(BrO_3)_2 \cdot 6H_2O$ (magnesium bromate),
$MgBr_2$ (magnesium bromide),
$MgBr_2 \cdot 6H_2O$,
$MgCO_3 \cdot 3H_2O$,
$Mg(ClO_3)_2 \cdot 6H_2O$ (magnesium chlorate),
$MgCl_2$,
$MgCrO_4 \cdot 7H_2O$ (magnesium chromate),
$MgHC_6H_5O_7 \cdot 5H_2O$ (magnesium dibasic citrate),
$Mg(HCO_2)_2 \cdot 2H_2O$ (magnesium formate),
$Mg(OH)_2$,
$MgI_2$ (magnesium iodide),
$Mg_3N_2$ (magnesium nitride),
$Mg(ClO_4)_2$ (magnesium perchlorate),
$Mg(ClO_4)_2 \cdot 6H_2O$,
$Mg_2P_2O_7 \cdot 3H_2O$ (magnesium pyrophosphate),
$MgSO_4 \cdot K_2SO_4 \cdot 6H_2O$ (magnesium potassium sulfate),
$MgSeO_4 \cdot 6H_2O$ (magnesium selenate),
$Mg_5Si_3$ (magnesium silicide),
$MgSiF_6 \cdot 6H_2O$ (magnesium silicofluoride),
$MgCl_2 \cdot NaCl \cdot H_2O$ (magnesium sodium chloride),
$MgSO_4$ (magnesium sulfate),
$MgSO_4 \cdot 7H_2O$,
$MgS$,
$MgSO_3 \cdot 6H_2O$,
$MgS_2O_3 \cdot 6H_2O$ (magnesium thiosulfate),
$Ca(HCO_2)_2$ (calcium formate),
$CaH_2$ (calcium hydride),
$Ca(OH)_2$,
$Ca(ClO)_2 \cdot 4H_2O$ (calcium hypochlorite),
$Ca(H_2PO_2)_2$ (calcium hypophosphite),
$CaI_2$,
$CaI_2 \cdot 6H_2O$,
$Ca(C_3H_5O_3)_2 \cdot 5H_2O$ (calcium lactate),
$Ca(NO_3)_2$,
$Ca(NO_3)_2 \cdot 4H_2O$,
$Ca_3N_2$,
$Ca(NO_2)_2 \cdot H_2O$,
$CaC_2O_4$ (calcium oxalate),
$CaO$,
$Ca(ClO_4)_2$ (calcium perchlorate),
$CaO_2 \cdot 8H_2O$,
$CaH_4(PO_4)_2 \cdot H_2O$,
$Ca(C_7H_5O_3)_2 \cdot 2H_2O$ (calcium salicylate),
$CaSiF_6$,
$CaSO_4$,
$CaSO_4 \cdot 2H_2O$,
$Ca(SH)_2 \cdot 6H_2O$ (calcium sulfhydrate),
$CaCS_3$ (calcium thiocarbonate),
$Zn(C_2H_3O_2)_2$ (zinc acetate),
$Zn(NH_2)_2$ (zinc amide),
$ZnSO_4 \cdot (NH_4)_2SO_4 \cdot 6H_2O$ (zinc ammonium sulfate),
$ZnBr_2$,
$ZnCO_3$,
$Zn(ClO_3)_2 \cdot 6H_2O$ (zinc chlorate),
$ZnCl_2$,
$ZnCrO_4$,
$Zn(CN)_2$,
$Zn(ClO_3)_2 \cdot 6H_2O$ (zinc chlorate),
$ZnF_2$,
$ZnF_2 \cdot 4H_2O$,
$Zn(HCO_2)_2$ (zinc formate),
$Zn(OH)_2$,
$Zn(IO_3)_2$,
$ZnI_2$,
$Zn(MnO_4)_2 \cdot 6H_2O$,
$ZnO_2$,
$ZnSiF_6 \cdot 6H_2O$,
$Sr(C_2H_3O_2)_2 \cdot \frac{1}{2}H_2O$ (strontium acetate),
$Sr(ClO_3)_2$ (strontium chlorate),
$SrCl_2$,
$SrBr_2$,
$SrF_2$,
$SrI_2$,
$SrCrO_4$,
$Sr(CN)_2 \cdot 4H_2O$,
$SrS_2O_6 \cdot 4H_2O$ (strontium dithionate),
$Sr(CHO_2)_2$,
$Sr(SH)_2$ (strontium hydrosulfide),
$Sr(OH)_2$,
$Sr(IO_3)_2$,
$Sr(C_3H_5O_3)_2 \cdot 3H_2O$ (strontium lactate),
$Sr(NO_3)_2$,
$Sr(NO_2)_2$,
$SrO$,
$SrC_2O_4 \cdot H_2O$ (strontium oxalate),
$Sr(ClO_4)_2$ (strontium perchlorate),
$SrO_2$,
$SrSiO_3$,
$SrSiF_6 \cdot 2H_2O$,
$SrS$,
$SrSO_3$,
$Sr(CNS)_2 \cdot 3H_2O$ (strontium thiocyanate),
$Cd(C_2H_3O_2)_2$ (cadmium acetate),
$CdCl_2 \cdot 4NH_4Cl$ (cadmium ammonium chloride),
$Cd(BrO_3)_2 \cdot H_2O$,
$CdBr_2$,
$CdCl_2$,
$CdI_2$,
$CdF_2$,
$Cd(ClO_3)_2 \cdot 2H_2O$ (cadmium chlorate),
$Cd(HCO_2)_2 \cdot 2H_2O$ (cadmium formate),
$Cd(OH)_2$,
$Cd(IO_3)_2$,
$Cd(NO_3)_2$,
$Cd(C_3H_5O_3)_2$ (cadmium lactate),
$Cd(MnO_4)_2 \cdot 6H_2O$,
$CdSeO_4 \cdot 2H_2O$,
$CdSO_4$,
$CdS$,
$CdSO_3$,
$Ba(C_2H_3O_2)_2$ (barium acetate),
$Ba(NH_2)_2$,
$BaBr_2$,
$BaCl_2$,
$BaI_2$,
$BaF_2$,
$BaPtBr_6 \cdot 10H_2O$ (barium bromoplatinate), $Ba(C_4H_7O_2)_2 \cdot 2H_2O$ (barium butyrate),
$BaCO_3$,
$Ba(ClO_3)_2$,
$BaO$,
$Ba(OH)_2 \cdot 8H_2O$,
$Ba(OH)_2 \cdot H_2O$,
$BaN_6$,
$BaN_6 \cdot H_2O$,
$Ba(NO_2)_2$,
$Ba(NO_2)_2 \cdot H_2O$,
$BaC_2O_4$,
$Ba(ClO_4)_2$,
$Ba(ClO_4)_2 \cdot 3H_2O$ (barium perchlorate),
$BaO_2$,
$BaS_2O_8 \cdot 4H_2O$ (barium persulfate),
$Ba(C_3H_5O_2)_2 \cdot H_2O$ (barium propionate),
$BaSiO_3$,
$BaSiF_6$,
$BaS_3$,
$BaS_4 \cdot 2H_2O$,
$BaSO_3$,
$BaS_2O_3 \cdot H_2O$ (barium thiosulfate).

Inorganic salts, especially those of magnesium, have been found to be particularly beneficial. It has also been discovered that the halides, particularly the chlorides, are desirable in the practice of this invention. Also, where a colored pigment is being produced, chromic compounds are particularly beneficial.

The raw pigment slurry is digested in the presence of the selected Group II compound at a temperature of at least 50° C., preferably at least 75° C., up to the boiling point of the slurry, usually 80° to 90° C.

The period of digestion is at least five minutes, typically at least 45 minutes, and preferably one hour to ten hours.

In one preferred embodiment of this invention, it is contemplated digesting the raw pigment slurry at a low acid pH, e.g., below 3.0, as disclosed in copending U.S. patent application Ser. No. 469,864, filed July 6, 1965, by Dr. Albert Dietz and Dr. Harry Lott, Jr.

In still another embodiment, the raw pigment slurry is digested at a high alkaline pH, e.g., at least 10.0, as disclosed in U.S. patent application Ser. No. 469,881, filed July 6, 1965, by Dr. Harry Lott, Jr. and Dr. Albert Dietz.

It is particularly expedient to coat or otherwise treat the pigment near the end of the digestion. Advantages are also obtained when the coating treatment is applied immediately subsequent to the digestion.

Likewise, when the pigment is digested at a higher pH, e.g., at least 10.0, it is of benefit to coat the pigment immediately following the digestion.

Typically, the pigment is coated following the digestion with at least one hydrous oxide of aluminum, titanium and/or silicon.

Accordingly, it is contemplated that this invention may be employed with other wet treatment processes, particularly the coating processes, e.g., as disclosed in U.S. Letters Patent 3,146,119.

The practice of this invention significantly improves the pigmentary properties of the treated pigment, particularly tint efficiency and tinting strength.

Tint efficiency as used herein refers to the reflectometry method disclosed on pages 704 to 715, volume 34, Journal of Paint Technology and Engineering (Official Digest, July 1962).

A standard common commercial type enamel paint is prepared out of a known amount of a standard pigment, vehicle, and colorant (tint).

An enamel paint is also prepared from the sample pigment, and compared with the standard using a reflectometer.

Titanium oxide pigment treated in accordance with this invention characteristically has a tint efficiency improvement of at least 3 percent, typically at least five percent. Thus, the pigment is commonly 97 to 110 percent of the standard as measured by a reflectometer.

Titanium oxide pigment not treated in accordance with this invention commonly has a tint efficiency of less than 95 percent.

Raw titanium oxide pigment produced by the vapor phase oxidation of $TiCl_4$ characteristically has a low tint efficiency. Often raw titanium oxide pigment will float or flood such that its tint efficiency cannot be determined. Floating or flooding is where the pigment floats to the top of the paint film and/or the tint has flocculated to the bottom of the film.

The tinting strength of the pigment may be determined by many arbitrary methods. One such method is A.S.T.M. D–332–26, "1949 Book of A.S.T.M. Standards," part 4, page 31, published by American Society for Testing Material, Philadelphia 3, Pa.

The following are typical working examples, representing the best mode contemplated by the inventors in the carrying out of this invention.

EXAMPLE I

Titanium tetrachloride ($TiCl_4$) is reacted in the vapor phase with oxygen at 1,000° C. in the presence of aluminum trichloride ($AlCl_3$) and silicon tetrachloride ($SiCl_4$) to produce a raw titanium oxide pigment containing about $1.80 \pm 0.15$ percent by weight $Al_2O_3$ and about $0.56 \pm 0.05$ percent by weight $SiO_2$ based on the weight of the raw titanium oxide pigment, the pigment having a tinting strength of 1670 and a mean diameter of less than 0.5 micron. The tint efficiency of the raw pigment cannot be determined because of floating or flooding.

One thousand (1,000) grams of the raw pigment is slurried in 3.75 liters of deionized water to form an aqueous slurry containing about 21 percent by weight pigment based on the total weight of the slurry.

The slurry is adujsted with 25 percent by weight $H_2SO_4$ from a pH of 3.7 to a pH of 1.2. There is then added 57 milliliters of aqheous $TiCl_4$ solution containing 247 grams of $TiCl_4$ per liter of solution.

The slurry is heated from 26° C. to 85° C. and the pH allowed to gradually increase from 1.2 to about 2.3 during a 45 to 60 minute period.

One hundred and five (105) grams of $Al_2(SO_4)_3 \cdot 18H_2O$ (in aqueous solution) is added to the slurry and the slurry pH adjusted to 4.5 with NaOH (25 percent by weight). The pH is then adjusted to 7.3 with 51 milliliters of aqueous $Na_2CO_3$ solution containing 25 percent by weight $Na_2CO_3$.

The slurry is adjusted for two hours at 85° C. and a pH of 7.3 to 8.0.

The slurry is filtered and there is recovered a pigment containing a hydrous coating of $TiO_2$ and $Al_2O_3$.

The recovered coated pigment has a tinting strength of 1750 and a tint efficiency of 92 percent.

EXAMPLE II

One thousand (1,000) grams of the raw titanium oxide pigment prepared in Example I is slurried in 3.75 liters of deionized water.

The slurry is adjusted with concentrated $H_2SO_4$ from a pH of 4.1 to 1.5 and heated to 85° C. The pH is allowed to gradually increase upward. At a pH of 2.0, there is added to the slurry 20.5 grams of $MgSO_4 \cdot 7H_2O$.

The slurry is adjusted with NaOH to a pH of 4.5. The pH is then decreased to 2.5 by the addition of 57 milliliters of aqueous $TiCl_4$ solution containing 247 grams of $TiCl_4$ per liter of solution.

One hundred and five (105) grams of $Al_2(SO_4)_3 \cdot 18H_2O$ is added and the slurry pH adjusted to 4.5 with NaOH.

The slurry is then adjusted to a pH of 7.3 with 80 milliliters of an aqueous solution containing 25 percent by weight $Na_2CO_3$, based on the total weight of the solution.

The slurry is digested for 50 minutes at 85° C. and at a pH of 7.0 to 7.3. The slurry is filtered and the coated titanium oxide pigment is recovered. The pigment has a tinting strength of 1800 and a tint efficiency of 101 percent.

EXAMPLE III

The procedure of Example II is repeated except that there is added to the pigment slurry 18 grams of $BaCl_2$ in lieu of the 20.2 grams of $MgSO_4 \cdot 7H_2O$.

The recovered coated pigment has a tinting strength of 1790 and a tint efficiency of 99 percent.

EXAMPLE IV

The procedure of Example II is repeated except that there is added to the pigment slurry 27 grams of $CaCl_2$ in lieu of the $MgSO_4 \cdot 7H_2O$.

The recovered coated pigment has a tinting strength of 1790 and a tint efficiency of 100 percent.

EXAMPLE V

Titanium tetrachloride ($TiCl_4$) is reacted in the vapor phase with oxygen in the presence of $AlCl_3$ and $SiCl_4$ to produce a raw titanium oxide pigment containing $1.80 \pm .15$ percent by weight $Al_2O_3$ and $0.56 \pm 0.05$ percent by weight $SiO_2$, basis the weight of the titanium oxide pigment.

The raw titanium oxide pigment has a tinting strength of 1670. A tint efficiency cannot be determined for the raw pigment because of floating or flooding of the pigment.

One thousand (1,000) grams of the pigment is slurried in 3.75 liters of deionized water.

The slurry is adjusted with NaOH from a pH of about 4.4 to about 11.8 and digested at 85° C. for 93 minutes. The slurry is maintained at a pH of about 11.8 throughout the digestion by the addition of NaOH.

HCl is added to the slurry during a period of 104 minutes to lower the pH gradually to 6.5. The slurry is again digested at 85° C. for 59 minutes. At the end of the digestion, the slurry pH is 6.2.

The slurry is filtered and the resulting titanium oxide filter cake washed with 16 displacements of water. The cake is dried over night at 65° C.

The dry, uncoated titanium oxide pigment has a tinting strength of 1770 and a tint efficiency of 102 percent.

EXAMPLE VI

The procedure of Example V is repeated except that the slurry is alkaline digested at the pH of 11.8 in the presence of 20 grams of $MgSO_4 \cdot 7H_2O$ (added prior to digestion).

The recovered titanium oxide pigment has a tinting strength of 1810 and a tint efficiency of 107 percent.

EXAMPLE VII

The procedure of Example V is repeated except that the slurry is alkaline digested at the pH of 11.8 in the presence of 21.0 grams of $BaCl_2$.

The recovered titanium oxide has a tinting strength of 1810 and a tint efficiency of 106 percent.

EXAMPLE VIII

The procedure of Example V is repeated except that the slurry is alkaline digested at the pH of 11.8 in the presence of 29.1 grams of $CaCl_2$.

The recovered titanium oxide pigment has a tinting strength of 1800 and a tint efficiency of 109 percent.

EXAMPLE IX

Titanium tetrachloride ($TiCl_4$) is reacted in the vapor phase with oxygen in the presence of $AlCl_3$ and $SiCl_4$ to produce a raw titanium oxide pigment containing $1.80 \pm .15$ percent by weight $Al_2O_3$ and $0.56 \pm 0.05$ percent by weight $SiO_2$, basis the weight of the titanium oxide pigment.

The raw pigment has a tinting strength of 1670. A tint efficiency cannot be determined for the pigment because of floating.

One thousand (1,000) grams of the raw pigment is slurried with 3.75 liters of deionized water.

The slurry is adjusted with $H_2SO_4$ from a pH of 4.2 to about 0.5 and digested at 85° C. for 93 minutes. The slurry is maintained at the pH of about 0.5 throughout the digestion by the addition of $H_2SO_4$.

Gaseous $NH_3$ is added to the slurry during a period of 104 minutes to raise the pH gradually to 6.5. The slurry is again digested at 85° C. for 59 minutes. At the end of the digestion, the slurry pH is 6.2.

The slurry is filtered and the resulting titanium oxide filter cake is washed with 16 displacements of water. The cake is dried over night at 65° C.

The dry, uncoated titanium oxide pigment has a tinting strength of 1770 and a tint efficiency of 102 percent.

EXAMPLE X

The procedure of Example IX is repeated except that 22.0 grams of $MgSO_4 \cdot 18H_2O$ is added to the slurry immediately before the slurry is digested at a pH of 0.5.

The recovered, uncoated pigment has a tinting strength of 1800 and a tint efficiency of 106 percent.

EXAMPLE XI

The procedure of Example IX is repeated except that 18.0 grams of $BaCl_2$ is added to the slurry prior to the digestion at a pH of 0.5.

The recovered, uncoated pigment has a tinting strength of 1810 and a tint efficiency of 105 percent.

EXAMPLE XII

The procedure of Example IX is repeated except that 29.0 grams of $CaCl_2$ is added to the slurry prior to the digestion at a pH of 0.5.

The recovered, uncoated pigment has a tinting strength of 1805 and a tint efficiency of 106 percent.

EXAMPLE XIII

The procedure of Example IX is repeated except that 14.0 grams of $BeCl_2$ is added to the slurry prior to the digestion at a pH of 0.5.

The recovered, uncoated pigment has a tinting strength of 1810 and a tint efficiency of 107 percent.

EXAMPLE XIV

The procedure of Example IX is repeated except that 28.0 grams of $ZnCl_2$ is added to the slurry prior to the digestion at a pH of 0.5.

The recovered, uncoated pigment has a tinting strength of 1810 and a tint efficiency of 107 percent.

EXAMPLE XV

The procedure of Example IX is repeated except that 17.0 grams of $CdCl_2$ is added to the slurry prior to the digestion at a pH of 0.5.

The recovered, uncoated pigment has a tinting strength of 1810 and a tint efficiency of 107 percent.

EXAMPLE XVI

The procedure of Example IX is repeated except that 10.0 grams of $SrCl_2$ is added to the slurry prior to the digestion at a pH of 0.5.

The recovered, uncoated pigment has a tinting strength of 1810 and a tint efficiency of 107 percent.

Although this invention has been described with particular reference to the production of pigmentary $TiO_2$ from titanium halide, especially a titanium tetrahalide selected from the group consisting of $TiCl_4$, $TiBr_4$ and $TiI_4$, it may be employed in treating other raw metal oxides. The term "metal" as employed herein is defined as including those elements exhibiting metal-like properties including the metalloids.

Examples, not by way of limitation of metal oxides, which may be treated by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, yttrium, ytterbium, zinc, zirconium, niobium, gallium, antimony, lead, and mercury.

While this invention has been described by reference to specific details of certain embodiments, it will be understood that the invention is not intended to be construed as limited to such details, except insofar as they are included in the appended claims.

We claim:

1. A process for treating raw pigmentary titanium dioxide produced by vapor phase oxidation of titanium halide, which comprises digesting an aqueous slurry of said titanium dioxide for at least five minutes at from about 50° C. to the boiling point of the slurry in the presence of at least 0.1 weight percent of at least one Group II element having an atomic weight less than 200, based on the amount of titanium dioxide in the slurry, and at a pH below 3 or at a pH of from 10 to 12.

2. A process according to claim 1 wherein the aqueous slurry is digested for from 45 minutes to 10 hours.

3. A process according to claim 1 wherein the aqueous slurry is digested at from 75° C. to the boiling point of the slurry.

4. A process according to claim 1 wherein at least 0.2 weight percent of at least one Group II element is present in the slurry.

5. A process for treating raw pigmentary titanium dioxide produced by vapor phase oxidation of titanium tetrahalide, which comprises digesting an aqueous slurry of said titanium dioxide for at least five minutes at from about 50° C. to the boiling point of the slurry in the presence of at least 0.1 weight percent of at least one Group II element having an atomic weight less than 200, based on the amount of titanium dioxide in the slurry, and at a pH below 3.

6. A process according to claim 5 wherein the aqueous slurry is digested for from 45 minutes to 10 hours.

7. A process according to claim 5 wherein at least 0.2 weight percent of at least one Group II element is present in the slurry.

8. A process according to claim 5 wherein the Group II element is selected from the group consisting of calcium and magnesium.

9. A process for treating raw pigmentary titanium dioxide produced by vapor oxidation of titanium tetrahalide, which comprises digesting an aqueous slurry of said titanium dioxide for at least five minutes at from about 50° C. to the boiling point of the slurry in the presence of at least 0.1 weight percent of at least one Group II element having an atomic weight less than 200, based on the amount of titanium dioxide in the slurry, at a pH of from 10 to 12.

10. A process according to claim 9 wherein the aqueous slurry is digested for from 45 minutes to 10 hours.

11. A process according to claim 9 wherein at least 0.2 weight percent of at least one Group II element is present in the slurry.

12. A process according to claim 9 wherein the Group II element is selected from the group consisting of calcium and magnesium.

13. A process for treating raw pigmentary titanium dioxide produced by vapor phase oxidation of titanium tetrahalide in the presence of at least one member selected from the group consisting of aluminum and silicon, which comprises digesting an aqueous slurry of said titanium dioxide for at least 5 minutes at from 50° C. to the boiling point of the slurry in the presence of at least 0.1 weight percent of at least one Group II element having an atomic weight of less than 200, based on the amount of titanium dioxide in the slurry, and at a pH below 3.

14. A process according to claim 13 wherein said Group II element is calcium.

15. A process for treating raw pigmentary titanium dioxide produced by vapor phase oxidation of titanium tetrahalide in the presence of at least one member selected from the group consisting of aluminum and silicon, which comprises digesting an aqueous slurry of said titanium dioxide for at least 5 minutes at from about 50° C. to the boiling point of the slurry in the presence of at least 0.1 weight percent of at least one Group II element having an atomic weight less than 200, based on the amount of titanium dioxide in the slurry, and at a pH of from 10 to 12.

16. A process according to claim 15 wherein said Group II element is calcium.

References Cited

UNITED STATES PATENTS

| | | | |
|---|---|---|---|
| 2,628,919 | 2/1953 | Tanner et al. | 106—300 XR |
| 2,817,595 | 12/1957 | Kalinowski | 23—202 XR |
| 3,152,000 | 10/1964 | Kingsbury | 106—300 |
| 3,172,772 | 3/1965 | Rowe | 106—300 |
| 3,203,818 | 8/1965 | Rechmann | 106—300 |
| 3,212,911 | 10/1965 | Bernstein et al. | 106—300 |
| 3,310,377 | 3/1967 | Stern et al. | 23—202 |
| 3,337,300 | 8/1967 | Hughes | 23—202 |

FOREIGN PATENTS 684,016  12/1952  Great Britain.

TOBIAS E. LEVOW, Primary Examiner

H. M. S. SNEED, Assistant Examiner

U.S. Cl. X.R.

106—288, 296, 297, 299, 303, 304, 306, 308, 309; 23—202